United States Patent
Sarver

[11] Patent Number: 5,839,658
[45] Date of Patent: Nov. 24, 1998

[54] METHOD OF RETROFITTING IRRIGATION CONTROL SYSTEMS

[76] Inventor: Larry C. Sarver, 108 Fairway Landings Dr., Canonsburg, Pa. 15317

[21] Appl. No.: 720,301

[22] Filed: Sep. 27, 1996

[51] Int. Cl.$^6$ .................................................. B05B 17/00
[52] U.S. Cl. ................................ 239/1; 239/64; 239/69; 239/75; 239/99
[58] Field of Search .................................. 239/63, 64, 69, 239/70, 71, 74, 75, 99, 551, 1

[56] References Cited

U.S. PATENT DOCUMENTS

| | | | |
|---|---|---|---|
| 3,653,595 | 4/1972 | Greengard, Jr. et al. | 239/70 |
| 3,951,339 | 4/1976 | DuFresne | 239/66 |
| 4,176,395 | 11/1979 | Evelyn-Veere et al. | 364/420 |
| 4,209,131 | 6/1980 | Barash et al. | 239/68 |
| 4,545,396 | 10/1985 | Miller et al. | 239/64 |
| 4,548,225 | 10/1985 | Busalacchi | 239/64 |
| 4,895,303 | 1/1990 | Freyvogel | 239/61 |
| 5,021,939 | 6/1991 | Pulgiese | 239/69 |
| 5,048,755 | 9/1991 | Dodds | 239/64 |
| 5,097,861 | 3/1992 | Hopkins et al. | 239/63 |
| 5,333,785 | 8/1994 | Dodds et al. | 239/69 |
| 5,337,957 | 8/1994 | Olson | 236/63 |
| 5,337,959 | 8/1994 | Boyd | 239/163 |
| 5,444,611 | 8/1995 | Woytowitz et al. | 364/145 |
| 5,479,338 | 12/1995 | Ericksen et al. | 364/145 |

*Primary Examiner*—Andres Kashnikow
*Assistant Examiner*—Lisa Ann Douglas
*Attorney, Agent, or Firm*—Webb Ziesenheim Bruening Logsdon Orkin & Hanson, P.C.

[57] ABSTRACT

A method of retrofitting existing irrigation systems is disclosed. An irrigation system having a control circuit of water supply and a plurality of valve assemblies including communication with the water supply is provided. The control circuit has a centralized controller, a plurality of independent valve control lines extending between the controller and each of the valve assemblies and a return line extending from each of the valve assemblies to the controller. According to the method, a terminal strip is installed within the controller and connects each of the valve control lines together, wherein each valve control line receives the same signal from the controller. An encoder is installed within the controller and a decoder is installed in series with each valve assembly.

11 Claims, 3 Drawing Sheets

METHOD OF RETROFITTING IRRIGATION CONTROL SYSTEMS

BACKGROUND OF THE INVENTION

1. Field of the Invention

The present invention relates to a method of retrofitting existing irrigation control systems, in particular, converting multi-wire control circuits to a two wire system.

2. Prior Art

Conventional irrigation and watering systems used on golf courses, office complexes and the like include a main water supply line having a number of branch pipes. Each of the branch pipes includes at least one sprinkler head. A valve located at each sprinkler head is operated by a solenoid or other control mechanism. Typically, a hard wired, remote central controller supplies individual low voltage power to a large number of control lines which extend along each of the supply pipes. Each power line terminates at one solenoid and valve arrangement. A common line returns from each of the solenoids to complete the circuit. In essence, each valve is controlled by a separate circuit.

There are presently thousands of such multi-wire irrigation and watering systems throughout the United States which were installed over the past few decades. Unfortunately, these conventional systems are difficult to modify. For example, when the layout of the sprinkler heads needs to be changed, branch pipes and valves must be moved or new branch pipes and valves must be installed. This requires a new power line to be installed, typically underground, from the central controller to the new branch pipe and valve. The ground and other structures between the central controller and the new valve must be torn up to allow installation of the power line. Oftentimes such new installation is practically impossible due to the presence of buildings or hardscape such as retaining walls, planters or patios.

One solution to this problem is the use of a two or three wire system for control of the irrigation system. In a two wire circuit, one wire provides A.C. current, a second wire provides a coded message to a plurality of remote watering stations and a third wire provides a return. The coded control message is decoded by decoders present at each solenoid and valve arrangement. Such systems are disclosed in U.S. Pat. Nos. 4,209,131; 4,176,395; and 5,048,755. In a two or three wire control circuit using coded control messages, additional solenoid and valve arrangements can be added to the circuit without the need for installation of new power lines from the controller to the additional solenoid and valve arrangements. Each of the systems disclosed in these patents represents a new installation of an irrigation or watering system. They do not solve the problem of the inflexibility of the multitude of existing irrigation and watering systems which currently operate on a multi-wire path.

Accordingly a need remains for a method of retrofitting existing irrigation systems having a multi-wire path to a simplified circuit, in particular, a two wire path, which is readily modifiable.

SUMMARY OF THE INVENTION

This need is met by the present invention which includes a method of retrofitting an existing irrigation system having the steps of: a) providing an irrigation system having a control circuit, a water supply, a plurality of valve assemblies in fluid communication with the water supply, the control circuit having a centralized controller, a plurality of independent valve control lines extending between the controller in each of the valve assemblies and a return line extending from each of the valve assemblies to the controller; b) installing a terminal strip within the controller connecting each of the valve control lines together, wherein each of the valve control lines receives the same signal from the controller; c) installing a control signal encoder within the controller; and d) installing a control signal decoder in series with each valve assembly. The encoder provides encoded control signals for each of the valve assemblies. Each of the decoders decodes the control signals and provides a decoded control signal to each respective one of the valve assemblies. The valve assemblies include a solenoid or other control mechanism connected to a valve.

The method of retrofitting an existing irrigation system may further include installing sensors in the control circuit where the sensors provide feedback, preferably via the return line, to the controller of the environmental conditions in the vicinity of the valve assemblies. The controller adjusts water flow to the valve assemblies in response to the feedback from the sensors. The sensors may detect an environmental condition including temperature, humidity, moisture, concentration of ground minerals, concentration of biocides, concentration of fertilizers and combinations thereof.

The present invention further includes a method of retrofitting an existing irrigation control circuit where the existing control circuit includes a centralized controller, a plurality of independent valve control lines connected to the controller, a valve assembly disposed on each of the control lines and a return line connecting each valve assembly to the controller including the steps of: a) installing a terminal strip within the controller connecting each of the valve control lines to the other, wherein each of the valve control lines receives the same signal from the controller; b) installing a control signal encoder within the controller; and c) installing a control signal decoder in series with each of the valve assemblies. Each of the encoders provides encoded control signals for each of the valve assemblies. The decoders decode the control signals and provide a decoded control signal to each respective one of the valve assemblies. The valve assemblies comprise a solenoid or other control mechanism connected to a valve.

The present invention also includes a retrofitted irrigation control circuit having a multi-wire irrigation control circuit having a centralized controller, a plurality of independent valve control lines connected to the controller, a plurality of valve assemblies disposed on each of the valve control lines and a return line connecting each valve assembly to the controller, a terminal strip connecting each valve control line together within the controller, a control signal encoder connected to the controller and a plurality of control signal decoders each connected in series with each valve assembly. The invention control circuit may also include a plurality of environmental sensors connected in series with each of the valve assemblies and providing feedback via the return line or the environmental conditions in the vicinity of each of the valve assemblies to the controller.

DETAILED DESCRIPTION OF THE PREFERRED EMBODIMENTS

Figure 1:
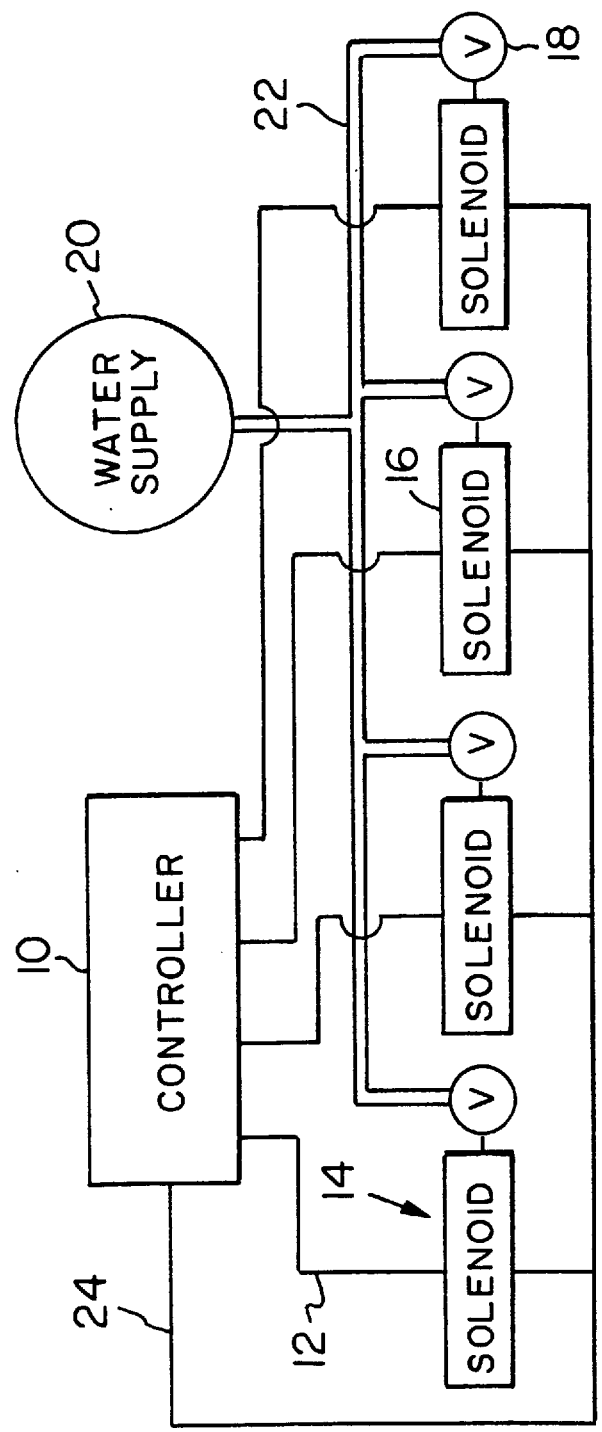
FIG. 1 is a schematic of a conventional multi-wire irrigation control system of the prior art.

A conventional irrigation control system is depicted in FIG. 1. Such conventional control systems include a controller 10 connected by a plurality of independent valve control lines 12 to a respective plurality of valve assemblies 14. Each valve assembly 14 includes a solenoid 16 or other mechanism for control of a valve 18. A main water supply 20 provides water through branch pipes 22 to each of the valves 18. Typically, the control lines 12 are installed underground together with their respective branch pipes 22. A common or return line 24 completes the circuit to the controller 10.

By the term "independent", it is meant that each valve control line 12 receives a separate control signal from controller 10. Each valve control line 12, in combination with the common or return line 24, essentially constitutes an independent electrical circuit.

Such multi-wire control systems are in place throughout the United States in golf courses, office complexes and the like. Up until the present invention, the only way to add an additional independently controlled valve assembly was to install a new valve control line. This required that the ground be torn up between the controller and the site of the new valve assemblies in order to lay the new valve control line. Such a disruptive installation is costly and labor intensive and oftentimes impractical due to the presence of buildings or hardscape between the controller and the site of the new valve assembly.

The present invention provides a method of retrofitting an existing multi-wire irrigation control system which avoids major disruptions to the landscape.

Figure 2:
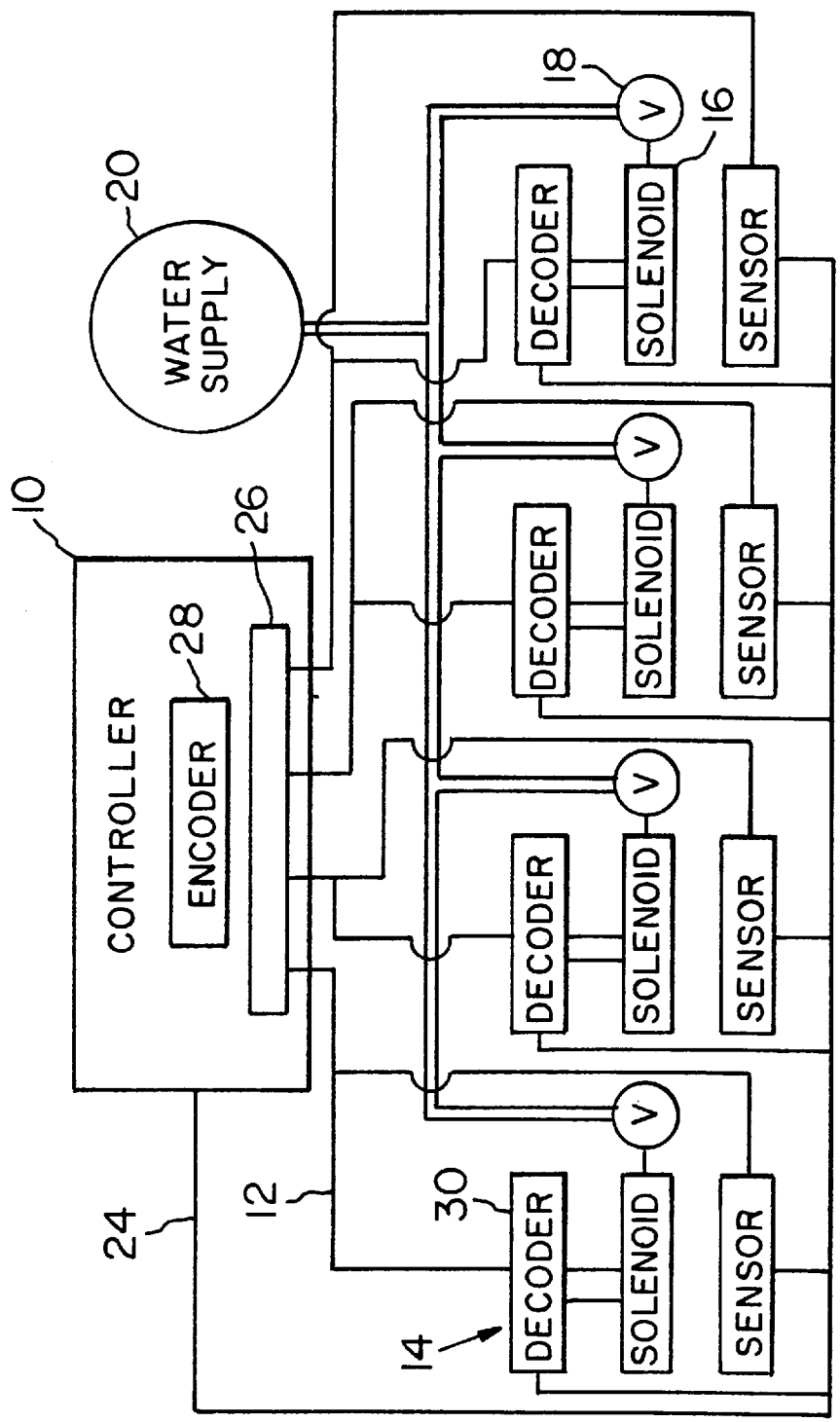
FIG. 2 is a schematic of a retrofitted multi-wire irrigation control system according to the present invention.

According to the present invention, a pre-existing multi-wire irrigation control system such as that depicted in FIG. 1 is retrofitted. A retrofitted multi-wire irrigation control system is depicted in FIG. 2. The reference numerals for structures common to both a pre-existing multi-wire irrigation control system (FIG. 1) and a retrofit thereof (FIG. 2) are the same.

A bus terminal strip 26 is added to the central controller 10 which connects each of the control lines 12 together. A signal encoder 28 is installed in the controller 10. The encoder provides encoded control signals for each valve assembly 14. Each control line 12, being tied together through terminal strip 26, receives the same encoded signals sent by controller 10 in conjunction with encoder 28. The valve control lines 12 are no longer independent of each other nor do they compose independent electrical circuits. The valve control lines 12 and their respective valve assemblies 14 are now in a parallel arrangement.

Each of the valve assemblies 14 includes a solenoid 16 and valve 18. A decoder 30 is added to each valve assembly 14 and decodes the control signals sent along each control line 12. According to the control signal decoded by each decoder 30 and provided to each respective one of the valve assemblies 14, the solenoid 16 at each valve assembly 14 is actuated and the corresponding valve 18 is opened or closed. The encoder 28 and decoder 30 are of the type well established in the art.

When the retrofitting of an existing irrigation system is complete, the control circuit essentially comprises a two wire circuit. The "first wire" is the combination of each of the control wires 12 now all in parallel to each other and all connected to one another via the terminal strip 26. The "second wire" is the common return line 24 returning from each valve assembly.

An existing irrigation system may be further retrofitted by adding sensors 32 in the vicinity of each valve assembly 14. Sensors 32 provide feedback via return line 24 to the controller on the environmental conditions in the vicinity of the valve assemblies 14. The controller 10 adjusts water flow to the valve assemblies 14 in response to the feedback information. The sensors 32 may detect a variety of environmental conditions including temperature, humidity, moisture, concentration of ground minerals, concentration of biocides, concentration of fertilizers and other conditions and combinations thereof. Such sensors 32 for detection of environmental conditions are known in the art.

Figure 3:
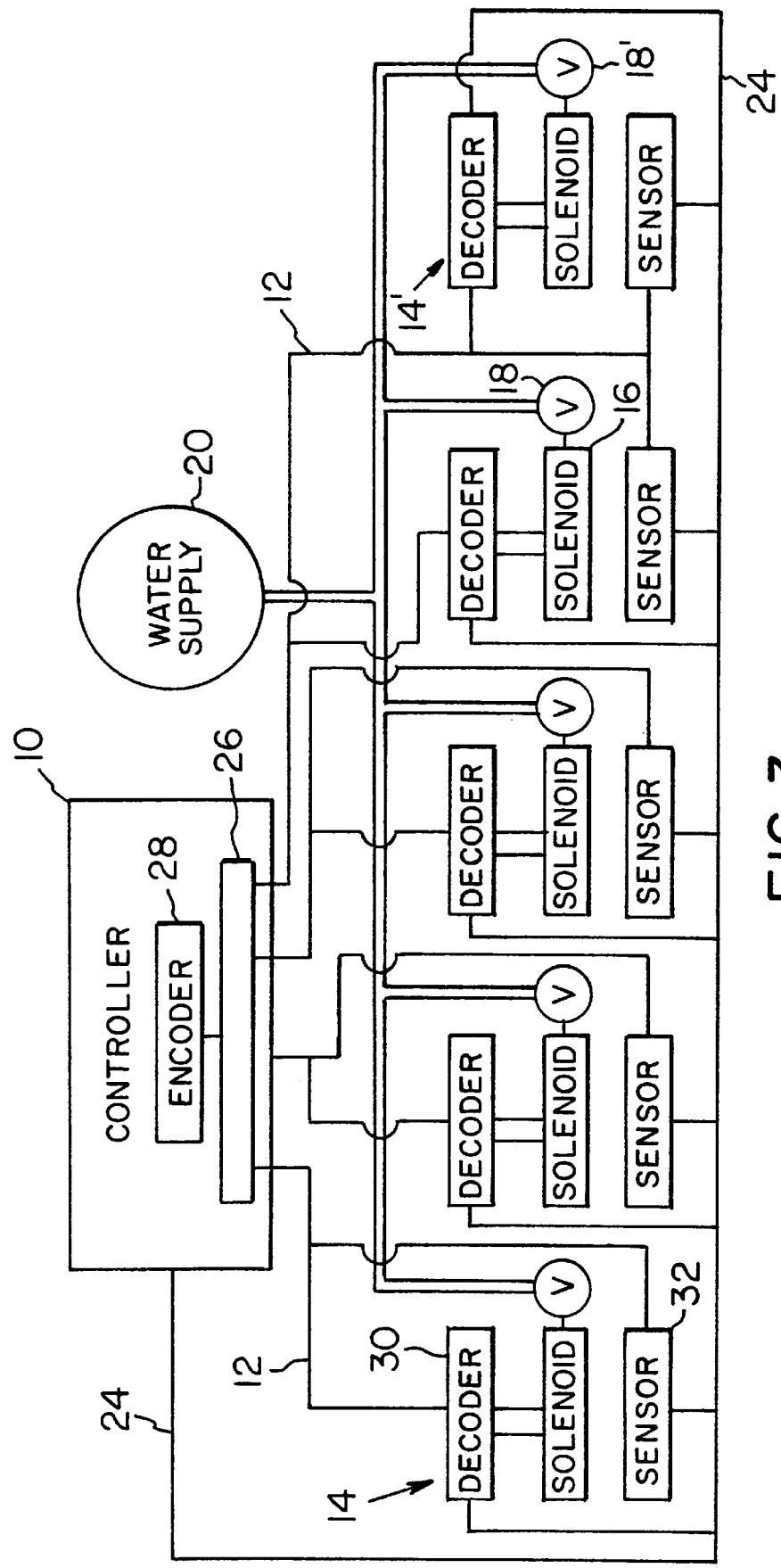
FIG. 3 illustrates an expansion of the retrofitted multi-wire irrigation control system illustrated in FIG. 2.

The present invention additionally allows for easy expansion of the irritation system and associated control structure as shown in FIG. 3. Specifically, if one or more new branch pipes and valves (18' in FIG. 3) are added to the retrofitted irrigation system shown in FIG. 2, the control for the new valve assemblies 14' can be run off of the closest control line 12 and return line 24. Generally, this will be from the closest existing valve assembly 14. As schematically shown in FIG. 3, expansion of the present system does not require running an individual control line 12 and individual return line 24 back to the controller 10 for any expanded segments of the system.

Although the present invention has been described in detail in connection to the discussed embodiments, various modifications may be made by one of ordinary skill in the art without departing from the spirit and scope of the present invention. Therefore, the scope of the present invention should be determined by the attached claims.

What is claimed is:

1. A method of retrofitting an existing irrigation system comprising the steps of:
    a) providing an existing irrigation system having a control circuit, a water supply, a plurality of valve assemblies in fluid communication with said water supply, said control circuit having a centralized controller, a plurality of independent valve control lines directly extending between said controller and each of said valve assemblies and a return control line extending from each of said valve assemblies directly to said controller;
    b) installing a terminal strip within said controller connecting each of said valve control lines together, wherein each said valve control line receives the same signal from said controller;
    c) installing a control signal encoder within said controller; and
    d) installing a control signal decoder in series with each of said valve assemblies.

2. The method of claim 1 wherein said encoder provides encoded control signals for each of said valve assemblies.

3. The method of claim 2 wherein each of said decoders decodes said control signals and provides a decoded control signal to each respective one of said valve assemblies.

4. The method of claim 1 wherein each of said valve assemblies comprises a solenoid connected to a valve.

5. The method of claim 1 further comprising installing sensors in said control circuit wherein said sensors provide feedback to said controller of environmental conditions in the vicinity of said valve assemblies whereby said controller adjusts water flow to said valve assemblies in response to said feedback.

6. The method of claim 5 wherein said sensors detect an environmental condition selected from the group consisting of temperature, humidity, moisture, concentration of ground minerals, concentration of biocides, concentration of fertilizers and combinations thereof.

7. A method of retrofitting an existing irrigation control circuit comprising the steps of:
   a) providing an existing irrigation control circuit having a centralized controller, a plurality of independent valve control lines directly connected to the controller, a valve assembly disposed on each of the control lines and a return line directly connecting each valve assembly to the controller;
   b) installing a terminal strip within said controller to connect each of said valve control lines together, wherein each said valve control line receives the same signal from said controller;
   c) installing a control signal encoder within said controller; and
   d) installing a control signal decoder in series with each said valve assembly.

8. The method of claim 7 wherein said encoder provides encoded control signals for each of said valve assemblies.

9. The method of claim 8 wherein each of said decoders decodes said control signals and provides a decoded control signal to each respective one of said valve assemblies.

10. A retrofitted irrigation control circuit comprising:

a multi-wire irrigation control circuit having a centralized controller, a plurality of independent valve control lines connected to the controller, a plurality of valve assemblies, each said valve assembly disposed on one of said valve control lines and a return line directly connecting each said valve assembly to said controller;

a terminal strip connecting each said valve control line together within said controller;

a control signal encoder connected to said controller; and a plurality of control signal decoders each connected in series with each said valve assembly.

11. The retrofitted irrigation control circuit of claim 10 further comprising a plurality of environmental sensors connected in series with each said valve assembly and providing feedback via said return line on environmental conditions in the vicinity of each said valve assembly to said controller.

* * * * *